(12) United States Patent
Secrest et al.

(10) Patent No.: US 10,383,279 B2
(45) Date of Patent: Aug. 20, 2019

(54) ELECTRONICS FOR AN ARTICULATED HARVESTING COMBINE

(71) Applicant: Tribine Industries LLC, Logansport, IN (US)

(72) Inventors: Russel S. Secrest, Newton, KS (US); Bryan S. Claerhout, Hesston, KS (US)

(73) Assignee: Tribine Industries LLC, Logansport, IN (US)

( * ) Notice: Subject to any disclaimer, the term of this patent is extended or adjusted under 35 U.S.C. 154(b) by 172 days.

(21) Appl. No.: 15/677,188

(22) Filed: Aug. 15, 2017

(65) Prior Publication Data

US 2018/0049369 A1 Feb. 22, 2018

Related U.S. Application Data

(60) Provisional application No. 62/376,957, filed on Aug. 19, 2016.

(51) Int. Cl.
| | |
|---|---|
| *A01D 41/00* | (2006.01) |
| *A01D 67/00* | (2006.01) |
| *A01B 69/00* | (2006.01) |
| *G05G 9/00* | (2006.01) |
| *A01D 41/127* | (2006.01) |

(52) U.S. Cl.
CPC ....... *A01D 41/127* (2013.01); *A01D 41/1273* (2013.01); *A01D 41/1276* (2013.01); *A01D 67/00* (2013.01); *A01B 69/007* (2013.01)

(58) Field of Classification Search
CPC .............. A01D 41/127; A01D 41/1276; A01D 41/1273; A01B 69/007
See application file for complete search history.

(56) References Cited

U.S. PATENT DOCUMENTS

| | | | |
|---|---|---|---|
| 7,334,658 B2* | 2/2008 | Berg | B62D 1/12 180/333 |
| 2017/0164554 A1* | 6/2017 | Roberts | A01D 41/127 |

\* cited by examiner

*Primary Examiner* — Yonel Beaulieu
(74) *Attorney, Agent, or Firm* — Mueller Law, LLC; Jerry K. Mueller, Jr.

(57) ABSTRACT

Disclosed is an articulated harvesting combine of a forward powered processing unit (PPU), a rear grain cart, and an articulation joint connecting the PPU and rear grain cart. Loss sensor pads in the straw discharge stream are graphically displaying to the operator. Articulation joint sensors rear teeth on an articulation joint arcuate beam and are used to display the degree of articulation to the operator. A jog motor permits the operator to move the feed house forwards/backwards to clear blockages. A right hand joystick and a left hand joystick provided control of all combine functions.

4 Claims, 13 Drawing Sheets

ELECTRONICS FOR AN ARTICULATED HARVESTING COMBINE

CROSS-REFERENCE TO RELATED APPLICATIONS

This application claims benefit of provisional 62/376,957 filed Aug. 19, 2016 is cross-referenced to application Ser. No. 14/946,827 filed Nov. 20, 2015; Ser. No. 14/946,842 filed Nov. 20, 2015, now U.S. Pat. No. 9,901,030; Ser. No. 14/967,691 filed Dec. 14, 2015, now U.S. Pat. No. 9,820,442; Ser. No. 15/621,218 filed Jun. 13, 2017; Ser. No. 15/623,619 filed Jun. 15, 2017, now U.S. Pat. No. 10,238,038; Ser. No. 15/642,799 filed Jul. 6, 2017; Ser. No. 15/636,728 filed Jun. 19, 2017, now U.S. Pat. No. 10,231,371; Ser. No. 15/649,684, filed Jul. 14, 2017, now U.S. Pat. No. 10,045,488; Ser. No. 15/652,806 filed Jul. 18, 2017, now U.S. Pat. No. 10,244,685; Ser. No. 15/654,786 filed Jul. 20, 2017; and Ser. No. 15/662,332 filed Jul. 28, 2017, now U.S. Pat. No. 10,155,550.

STATEMENT REGARDING FEDERALLY SPONSORED RESEARCH AND DEVELOPMENT

Not applicable.

BACKGROUND OF THE INVENTION

The present disclosure relates to harvesting combines, optionally articulated (jointed), and more particularly to improved electronic controls and displays therefor.

An articulated combine has a forward powered processing unit ("PPU") and a towed grain cart joined by an articulation joint assembly. Application Ser. No. 14/946,827 filed Nov. 20, 2015; Ser. No. 14/946,842 filed Nov. 20, 2015; Ser. No. 14/967,691 filed Dec. 14, 2015; Ser. No. 15/621,218 filed Jun. 13, 2017; Ser. No. 15/623,619 filed Jun. 15, 2017; Ser. No. 15/642,799 filed Jul. 6, 2017; Ser. No. 15/636,728 filed Jun. 29, 2017; and Ser. No. 15/649,684, filed Jul. 14, 2017, disclose such an articulated combine assembly.

There are a variety of electronics required to efficiently and effectively operate a modern harvesting combine. There are even more requirements put on an articulated combine, such as that described in the co-pending applications. For example, an articulated harvesting combine can crab the grain cart for grain unloading, the grain cart wheels are steerable in addition to the articulation joint, etc. Moreover, the grain loss sensing system needs to be effectively used by the operator, as well as grain unloading. Steering an articulated combine evokes additional challenges to the operator. The myriad of additional sensors also need to be presented to the operator for use in controlling the various functions of the combine.

Thus, there is a need for electronics displays, driving, unloading, and like operations for the articulated harvesting combine. It is to these considerations that the present disclosure is addressed.

BRIEF SUMMARY OF THE INVENTION

One aspect of the disclosure is a grain loss system for a harvesting combine that uses grain loss sensor pads distributed across the width of a straw discharge stream. Each pad responds with a signal when struck by grain in the straw discharge stream. An electronic control unit receives grain loss signals from the grain loss sensor pads at a sampling rate in excess of about 10,000 samples per second. A display receives the sample signals from the electronic control unit and visually displays the number of grain impacts for each grain loss sensor pad.

Another aspect of the disclosure is a system for clearing blockages in the feeder house of a harvesting combine, which uses an independent jog motor attached to the feeder house. An operator engaged control engages the jog motor in each direction for clearing feeder house blockages. The jog motor control can be located on an operator joystick.

A further aspect of the disclosure is system for determining the degree of articulation of an articulation joint of an articulated harvesting combine of a forward powered processing unit PPU), a rear grain cart, and an articulation joint attached between the PPU and the rear grain cart. The articulation joint includes a PPU carried drawbar having a central pivot connection attached to a tube extending to the rear grain cart, a pair of articulation cylinders attached between the PPU bracket and the tube, and an arcuate beam carried by the PPU from one side of the PPU to the other side of the PPU and extending through a bracket carried by the tube. The arcuate beam carries a series of teeth located on its inside. A sensor assembly is carried by the tube bracket and reads the series of arcuate beam teeth. An electronic control unit (ECU) having a memory receives data from the sensor assembly. The ECU memory stores the degree of articulation as measured by the sensor assembly. A display confronts the harvesting combine operator and receives a signal from the ECU indicative of the degree of articulation of the articulation joint.

A yet further aspect of the disclosure is a joystick system for controlling functions of an articulated harvesting combine from an operator station of a chair assembly for the operator. The articulated harvesting combine includes a forward powered processing unit (PPU), a rear grain cart, and an articulation joint with articulation cylinders connecting the PPU and the rear grain cart. The operator chair assembly carries a left hand joystick assembly movable forward and reverse for extending and retracting a grain unloader assembly, movable left and right to extend or retract the articulation cylinders to turn the articulated harvesting combine, and twisting to manually control crabbing of the rear grain cart. The operator chair assembly also carries a right hand joystick assembly movable forwardly to control the forward speed of the articulated harvesting combine, and rearwardly to control the backward speed of the articulated harvesting combine.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

The articulated combine has two operator joysticks for complete control of the articulated harvesting combine, which is new for harvesting combines in general, and specifically new for articulated harvesting combines. Which joystick controls which valves, motors, and like equipment carried by the articulated harvesting combine is a new development reported herein also. Further, the data for the novel grain loss sensors of the disclosed articulated harvesting combine are presented to the operator is a unique fashion, as disclosed herein.

Figure 1:
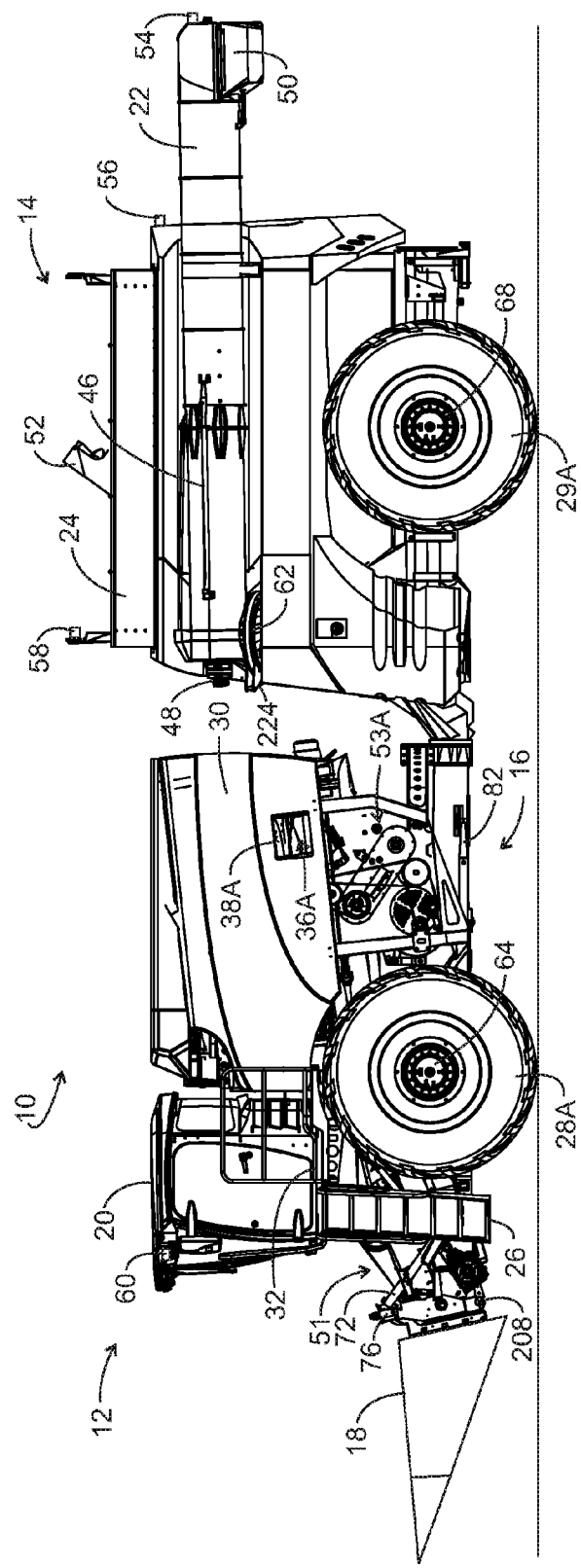
FIG. 1 is a side view of the articulated harvesting combine.
Figure 2:
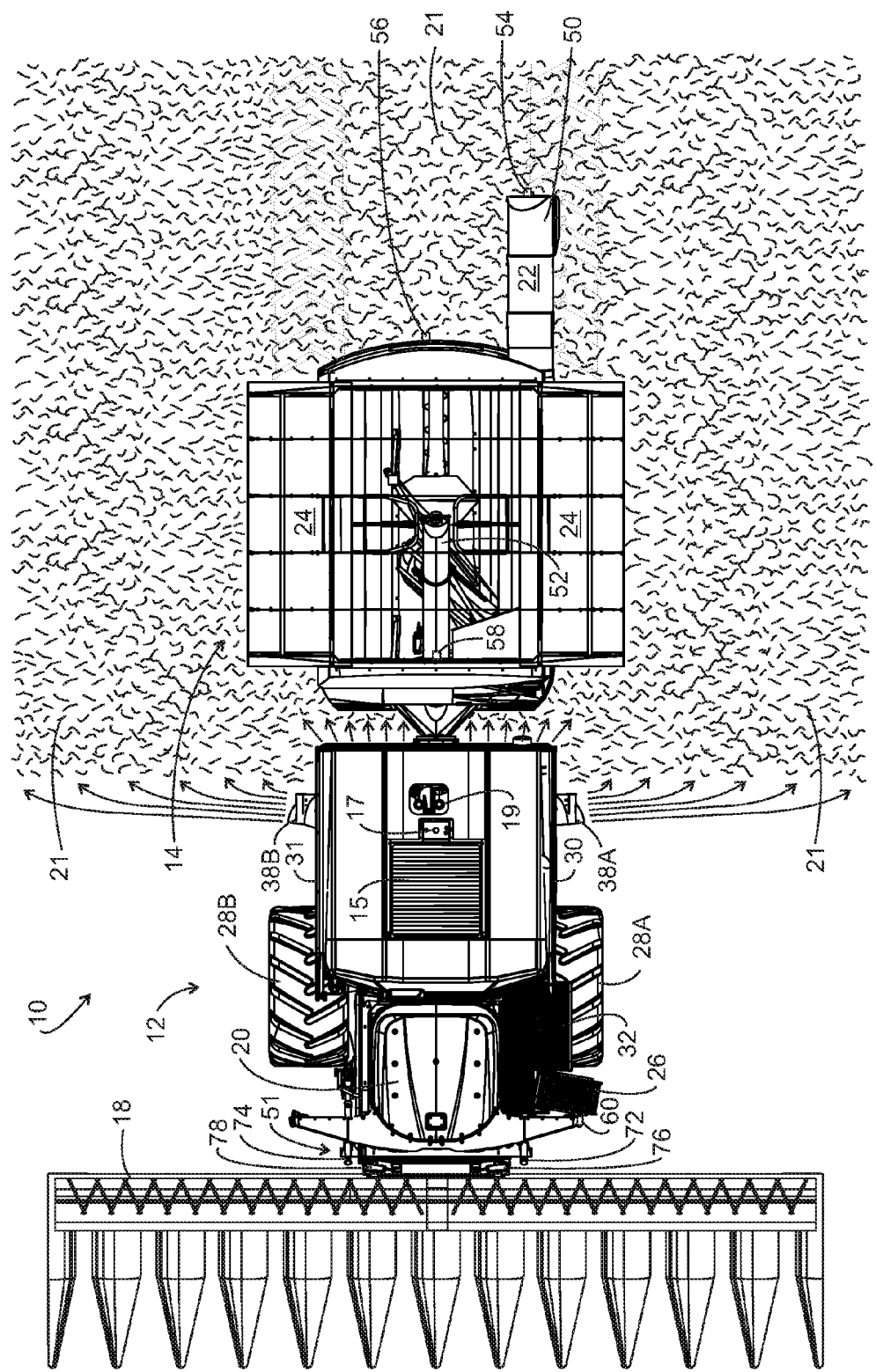
FIG. 2 is a top view of the articulated harvesting combine of FIG. 1.
Figure 3:
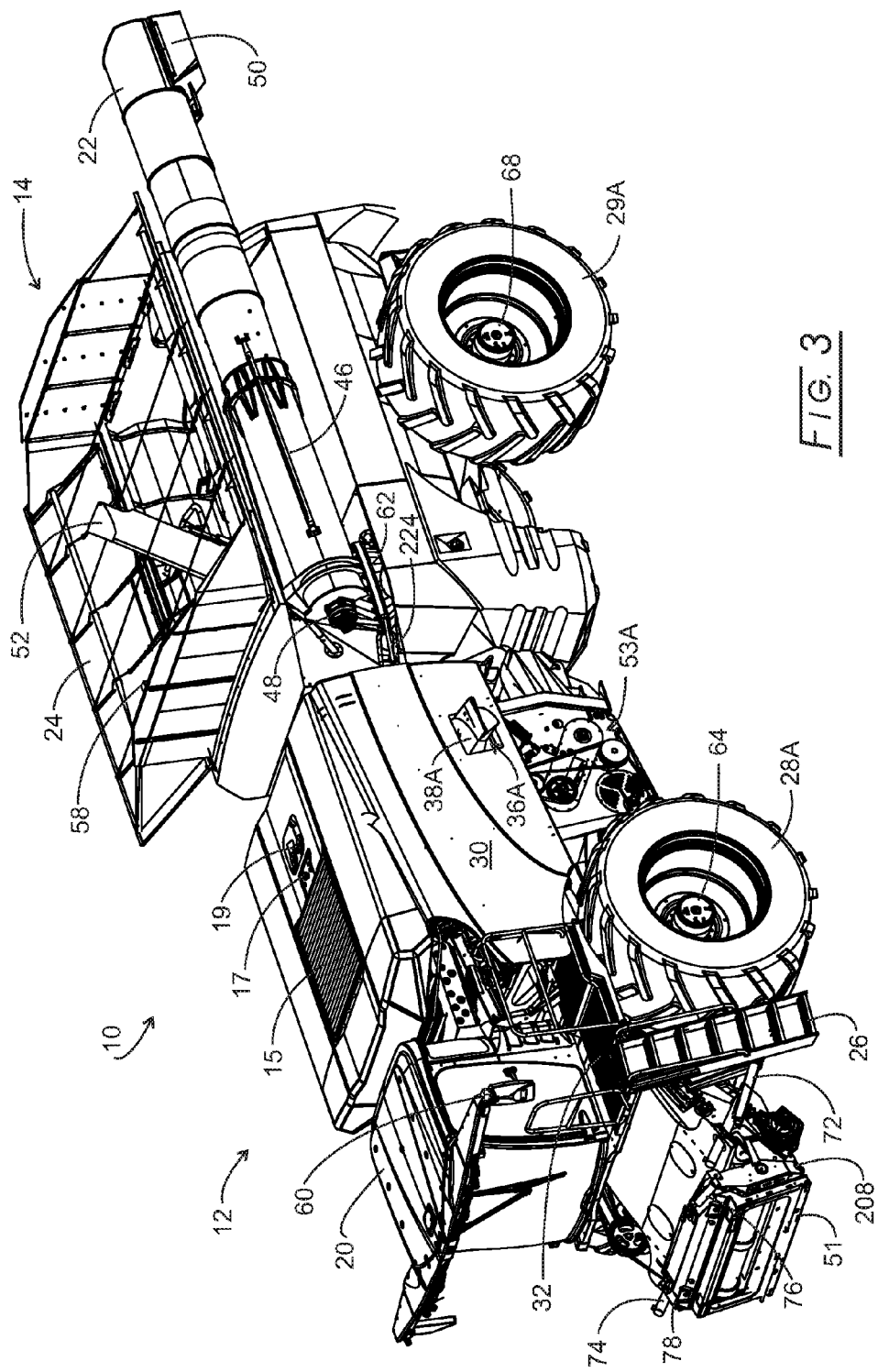
FIG. 3 is an isometric view of the left side of the articulated harvesting combine of FIG. 1.

Referring now to the drawings and specifically referring initially to FIGS. 1, 2, 3, and 4 an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, supported by a feeder house, 51, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. A radiator cap, 17, and engine exhaust, 19, are located behind screened air inlet 15. The arrows in FIG. 2 show the distribution of chopped straw, 21, created by the disclosed straw chopper assemblies. It will be observed that the distribution is at least as wide as grainhead 18, as desired, and the distribution is relatively even across the entire wide of chopped straw 21.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Jul. 28, 2017.

Figure 15:
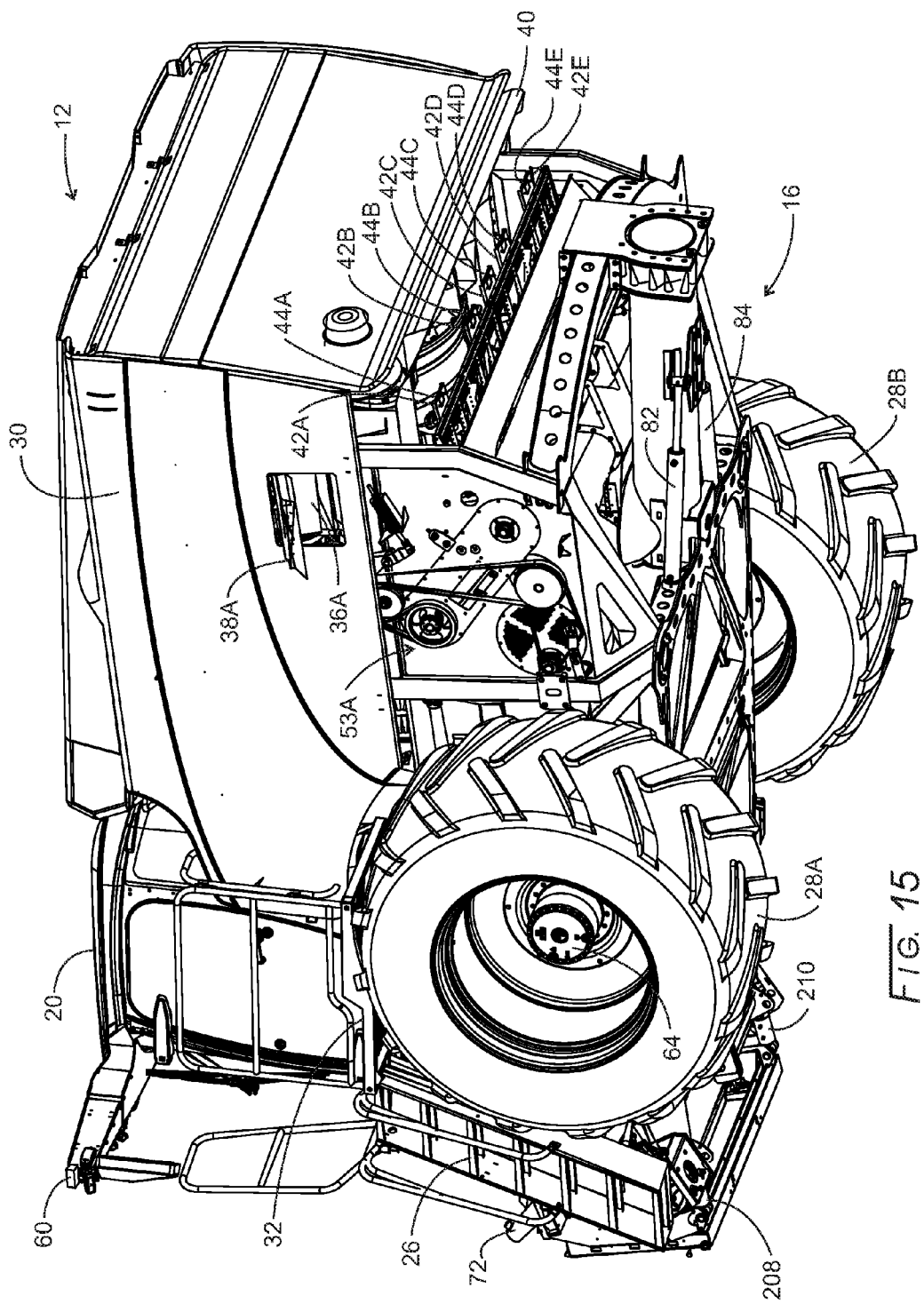
FIG. 15 is an isometric view of the left rear end of the forward unit of the articulated harvesting combine of FIG. 1 slightly from underneath the harvesting combine.

Referring now also to FIG. 15, the operator is granted access to cab 20 by a stair assembly, 26, as more fully described in U.S. Ser. No. 15/654,786, filed Jul. 20, 2017. PPU 12 is supported by wheel assemblies, 28A and 28B (FIG. 2). Movable side panels, 30 and 31, grant access to the operator or mechanic to the internal mechanisms housed with in PPU 12 from stair assembly 26 and a platform, 32, and retains a foldable platform movable from a vertical home position while the panels are in place to a horizontal active position when the panels are moved away. Such foldable platform mates with platform 32. The trim panel assemblies are more fully described in U.S. Ser. No. 15/662, 332 filed Jul. 28, 2017.

In FIG. 15, a rear panel, 34, covers the back of PPU 12. Towards the rear of both panels 30 and 31 are MOG (or for present purposes, chopped straw) outlets, 36A and 36B, respectively, having top deflector plates, 38A and 38B, respectively. These deflector plates are adjustable for determining the location for depositing MOG expelled from the straw chopper assemblies, as further detailed In U.S. Ser. No. 15/652,806, filed Jul. 18, 2017. MOG discharged from the rear of PPU 12 strikes a deflector, 40, to direct the MOG downwardly and not at grain cart 14. Five extensions, 42A-42E, terminated by sensors, 44A-44E, respectively, are located just before hood 40 and provide grain loss data to the operator.

Off-loading auger assembly 22 telescopes using a pair of cylinder assemblies, only a cylinder assembly, 46, shown in the drawings with a similar assembly located oppositely. The auger assembly located within grain off-loading assembly 22 is powered by a motor, 48, located on the opposite end from a grain discharge hood, 50. An ascending lift auger assembly, 52, dumps clean grain into grain cart 14 through openings located in its upper section with a motor (not shown) located within the auger assembly at its top with the motor surrounded by grain. A slew bearing assembly or slewing ring bearing assembly, 62, connects an unload lift auger assembly (not seen in the drawings) to off-loading auger assembly 22 cylinder 224 rotates auger assembly 22 on slew bearing assembly 62. Reference is made to U.S. Ser. No. 14/946,842 cited above for further details on grain cart 14 and its details of operation.

Additionally, a camera, 54, is located on hood 50 for the operator to see into the ground grain vehicle into which grain from grain cart 14 is transferred. Another camera, 56 is located at the rear of grain cart 14 to aid the operator in backing up articulated harvesting combine 10. Another camera, 58, is located atop the front of grain cart 14 for the operator to see inside grain cart 14. Finally, a camera, 60, is located on the left rear view mirror assembly on cab 20 so that the operator can see the grain unloading operation. Further details on the cameras can be found in U.S. Ser. No. 14/650,886 cited above.

Figure 4:
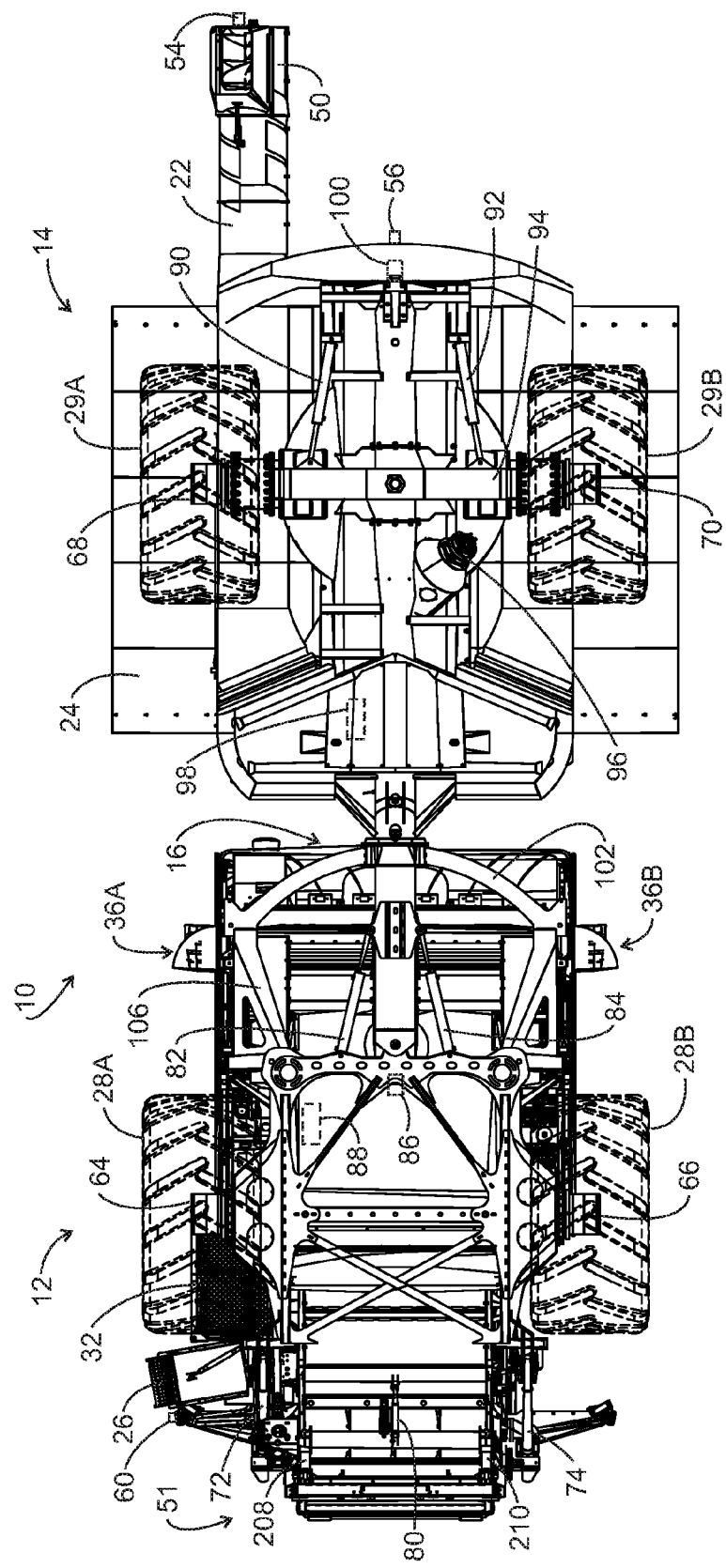
FIG. 4 is a bottom view of the articulated harvesting combine of FIG. 1.

All wheel assemblies on both PPU 12 and grain cart 14 are independently driven by hydraulic motors, 64 (for wheel assembly 28A), 66 (wheel assembly 28B, FIG. 4), 68 (wheel assembly 29A), and 70 (wheel assembly 29B, FIG. 4). Each of these motors can be independently controlled by the combine operator or a central processing unit (CPU) or electronic control unit (ECU) can be used to automatically operate the motors for steering of combine 10.

Bonus sieves feed conveyor assemblies, 53A and 53B, can be seen near the bottom rear sides of PPU 12 and drive the unique bonus sieves assemblies that provide additional threshing capacity for PPU 12, as more fully detailed in U.S. Ser. No. 15/649,684, cited above.

Because harvesting combine 10 will be used in fields that undulate in both directions, grainhead 18 will need to be adjustable both side-to-side and heel-to-toe (forward and backward tilting) in order to keep on the ground for maximizing grain harvesting. Feeder house assembly 51, then, has cylinder assemblies, 72 and 74 (see FIG. 3), that provide the lift movement of feeder assembly 51 for raising and lowering grainhead 18. Movement up and down of the ends of grainhead 18 is accomplished with cylinder assemblies, 76 and 78 (see FIG. 3). Heel-to-toe movement of grainhead 18 is provided by cylinder assemblies, 208 and 210 (see FIG. 12) and more fully disclosed in Ser. No. 15/621,218, cited above. A mid-mounted rock beater roller assembly in feeder house 51 is connected to a cylinder assembly, 80, operable remotely by the operator is actable to open the reservoir to dump its contents, such as at the end or side of the field being harvested.

With respect to steering of combine 10, articulation cylinders, 82 and 84, are seen in FIG. 4 at the rear of PPU 12, along with a hydraulic motor, 86 (see also FIG. 5), for the joint auger that passes grain from PPU 12 to grain cart 14. Hydraulic valving manifold, 88, is located to the rear of hydraulic motor 86. Crabbing/steering cylinder assemblies, 90 and 92, push a grain cart axle assembly, 94. Additionally revealed in FIG. 4 for grain cart 14 is a lift auger motor, 96; grain cart hydraulic valving manifold, 98; and a drag auger motor, 100.

Figure 5:
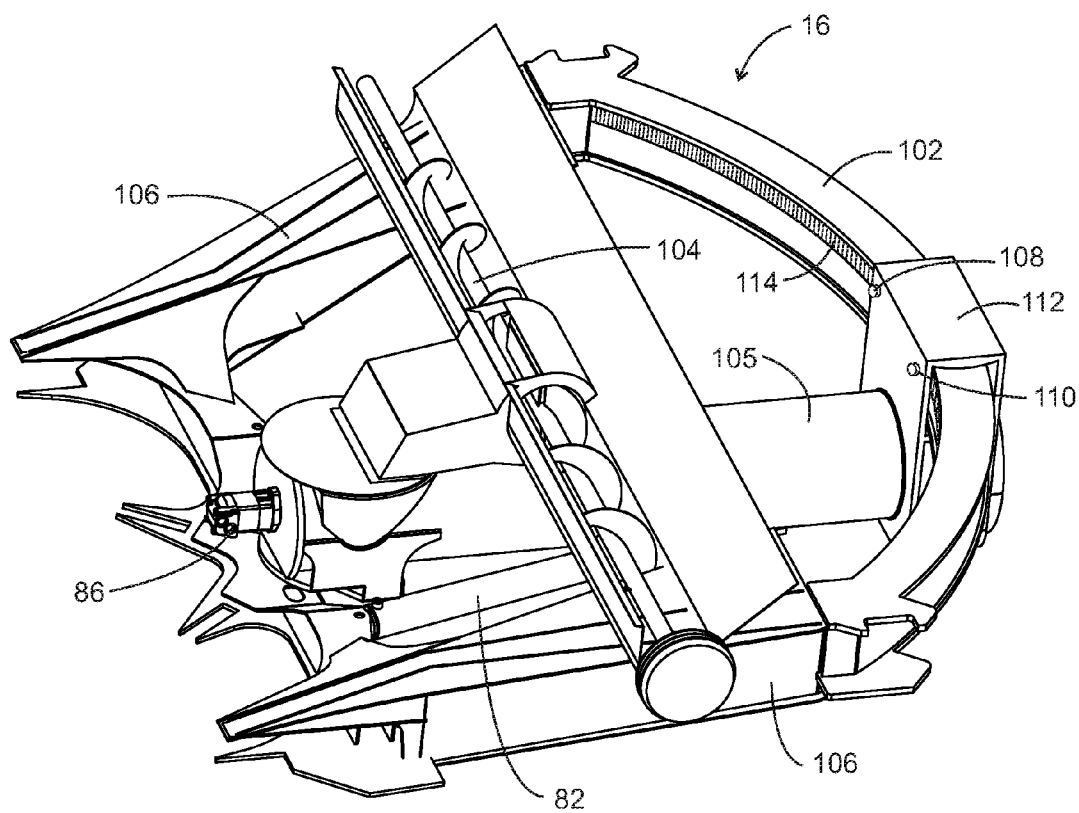
FIG. 5 is an isometric view of the articulation joint assembly of the articulated harvesting combine of FIG. 1.

Referring to articulation joint assembly 16 in FIG. 5, an arcuate beam or bridge, 102, articulation cylinder assembly 82, and a transverse auger assembly, 104, that has flights that clean grain in to its center to feed the auger assembly housed within a tube, 105, housing an auger assembly that transfers clean grain to grain cart 14. Bridge 102 is carried by PPU frame assembly, 106. A pair of sensors, 108 and 110, are carried by a bracket assembly, 112 that surrounds bridge 102. On the inside surface of bridge 102 are a series of teeth, 114, that sensors 108 and 110 count in order to know how many degrees articulation joint assembly 16 has moved for steering of combine 10. This information is sent to the operator in cab 20.

Figure 6:
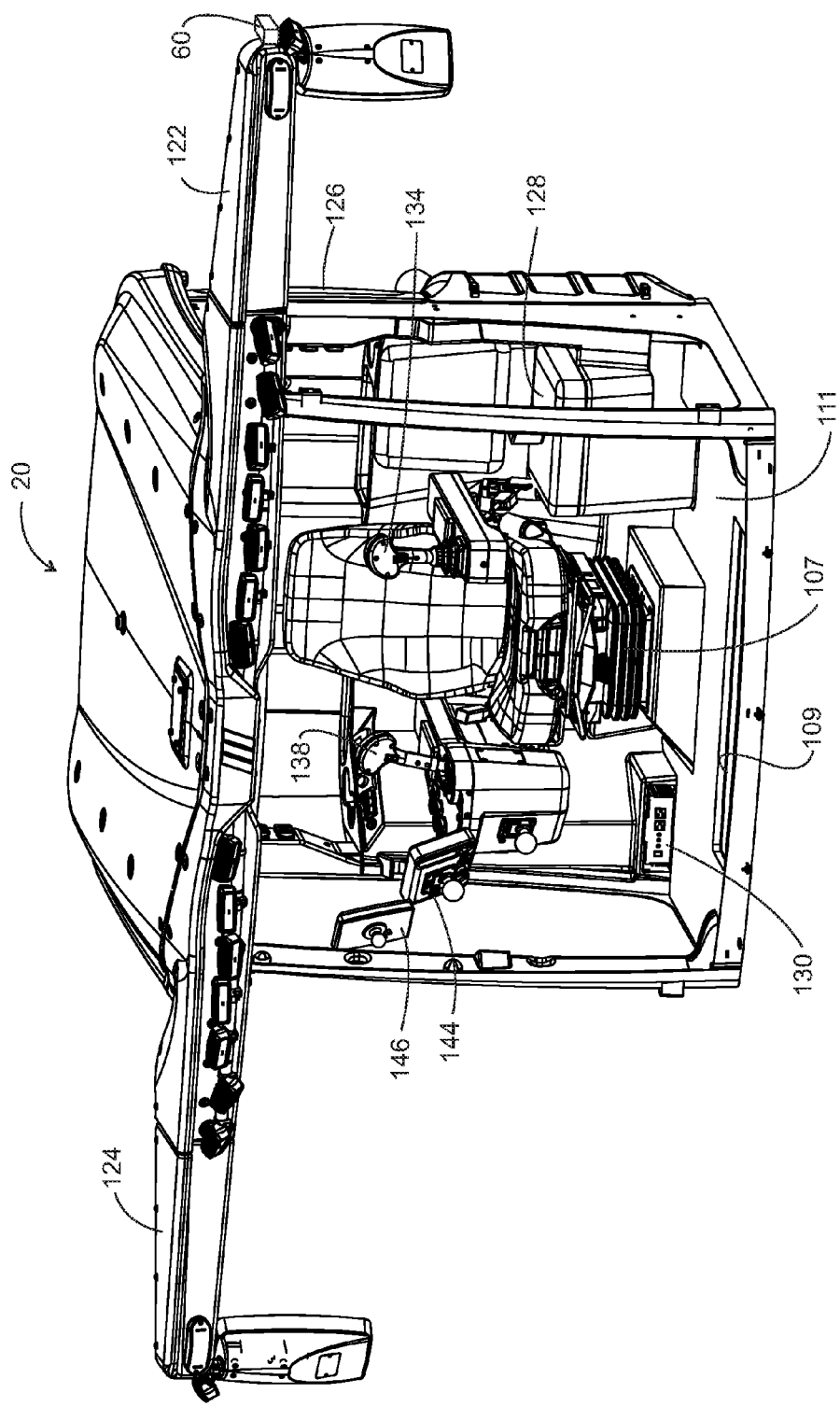
FIG. 6 is an isometric view of the cab of the articulated harvesting combine of FIG. 1.

Referring now to FIG. 6, the operator station for the combine operator is revealed. In particular, the operator is seated on a seat assembly, 107, where the operator can view the surroundings through an opening, 109 in a floor, 111, of cab 120; left rear mirror assembly, 122, that carries camera 60; and right hand mirror assembly 124. Additionally, the operator has a right rear corner window, 126, enabling the grain unloading procedure to be monitored in addition to left rear view mirror assembly 122 and camera 60. An auxiliary seat assembly, 128, is located to the left of operator seat assembly 107. An invertor assembly, 130, is located on the floor behind and to the right of operator seat assembly 107. Cab 20 also can be outfitted with a music system, telecommunications, global positioning satellite (GPS) communication, refrigerator, and like equipment.

Figure 7:
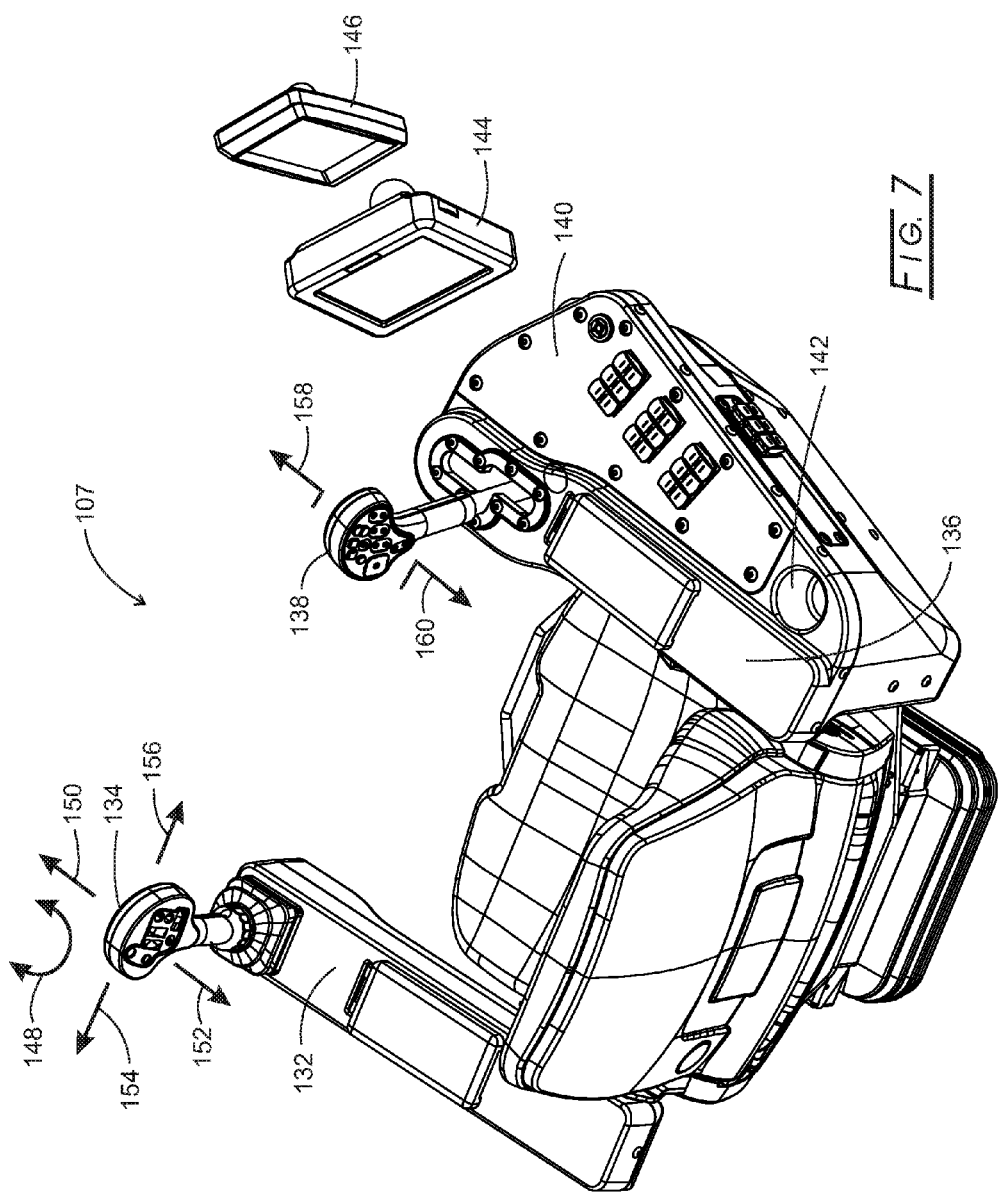
FIG. 7 is an isometric view of the cab seating assembly, control joysticks, and operator displays of the articulated harvesting combine of FIG. 1.

FIG. 7 details operator seat assembly 107 in more detail. A left arm rest assembly, 132, carries a left joystick assembly, 134, at its distal end, while a right hand arm rest assembly, 136, carries a right joystick assembly, 138, at its distal end, along with a rocker panel assembly, 140, and cup holder assembly, 142. A pair of displays, 144 and 146, are located to right and at a higher elevation than right arm assembly 136, but in clear view of an operator seated upon seat assembly 107.

The arrows about left joystick assembly 134 delineate its various control aspects and movement, as follow:

| Arrow | Joystick 134 Movement | Action |
|---|---|---|
| 148 | Rotation | Manual crabbing of rear grain cart 14 |
| 150 | Push forward | Extend grain unloader arm 22 |
| 152 | Pull backward | Retract grain unloader arm 22 |
| 154 | Push left | Turn combine 10 left with articulation cylinders |
| 156 | Push Right | Turn combine 10 right with articulation cylinders |

The arrows about right joystick assembly 138 delineate its various control aspects and movement, as follow:

| Arrow | Joystick 138 Movement | Action |
|---|---|---|
| 158 | Push forward | Forward motion and speed of combine 10 |
| 160 | Pull backward | Rear motion and speed of combine 10 |

It should be noted that the further forward or rearward joystick 138 is moved, the faster the ground speed of combine 10.

Figures 8, 9:
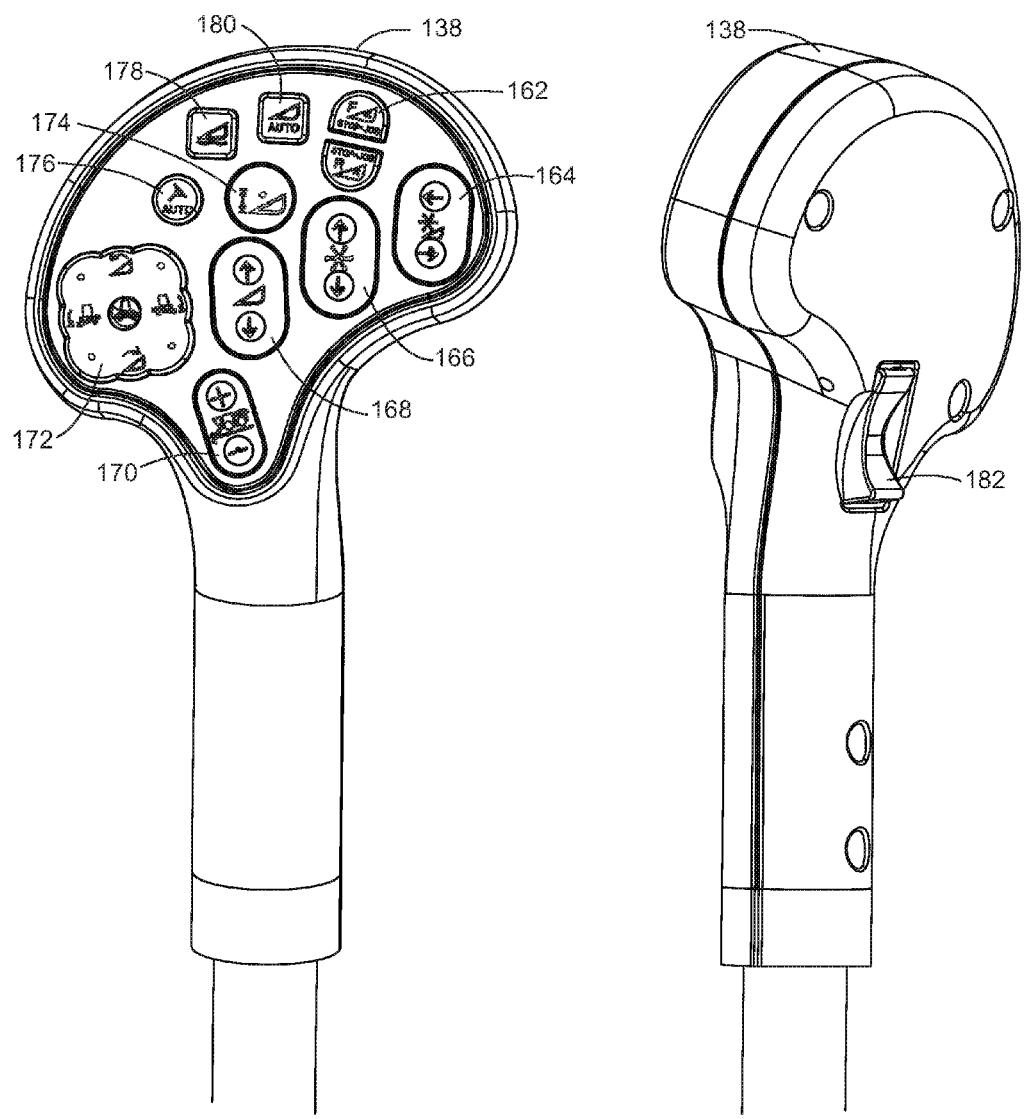
FIG. 8 is a front view of the right joystick.
FIG. 9 is a rear view of the right joystick.

Referring now FIGS. 8 and 9, the following table delineates the functions for the various switches on right joystick 138:

| Number | Function Description |
|---|---|
| 162 | Press either the top or bottom button to cause the feeder house to stop abruptly. Then, pressing the top jogs the feeder forward, while pressing the bottom jogs the feeder backwards. Neither action reengages the feeder. A separate jog motor is used to clear the feeder. |
| 164 | Reel for and aft control. |
| 166 | Raise and lower the reel. |
| 168 | Raise and lower header. |
| 170 | Ground speed range control. Within the limits of the full range ground speed control of the hydrostatic drive, this control will allow operator to choose a speed range the operator would like to limit a full stroke move of the stick. Operator could choose to go (Forward or Reverse) 0 to 9 mph; 0 to 15 mph; or 0 to top speed for road. (of course reverse will be controlled to a lesser speed range than forward speed). |
| 172 | All of these functions are manifested in a single square shaped, eight (8) way rocker switch. 4 side functions and 4 corner functions. The up and down movement tilts header fore/aft; right/left movement tilts the header likewise; pushing the corners activates both lift and tilt in the intuitive directions. This switch enables simultaneous multiple direction header movement. |
| 174 | Automatically returns the header to a pre-determined cutting height. |
| 176 | Engages auto steer. |
| 178 | Engages header float function. |
| 180 | Engages automatic header height function. |

Additionally, FIG. 9 shows a switch, 182, that currently is not assigned a function.

Figure 10:
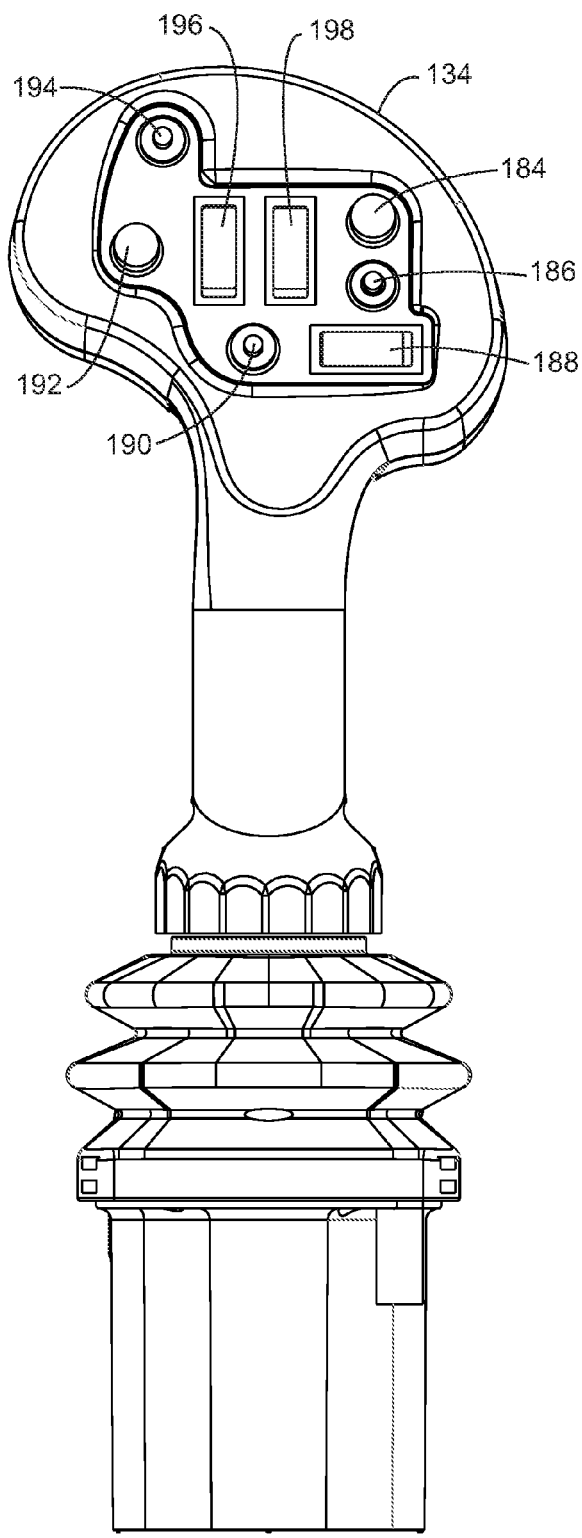
FIG. 10 is a front view of the left joystick.
Figure 11:
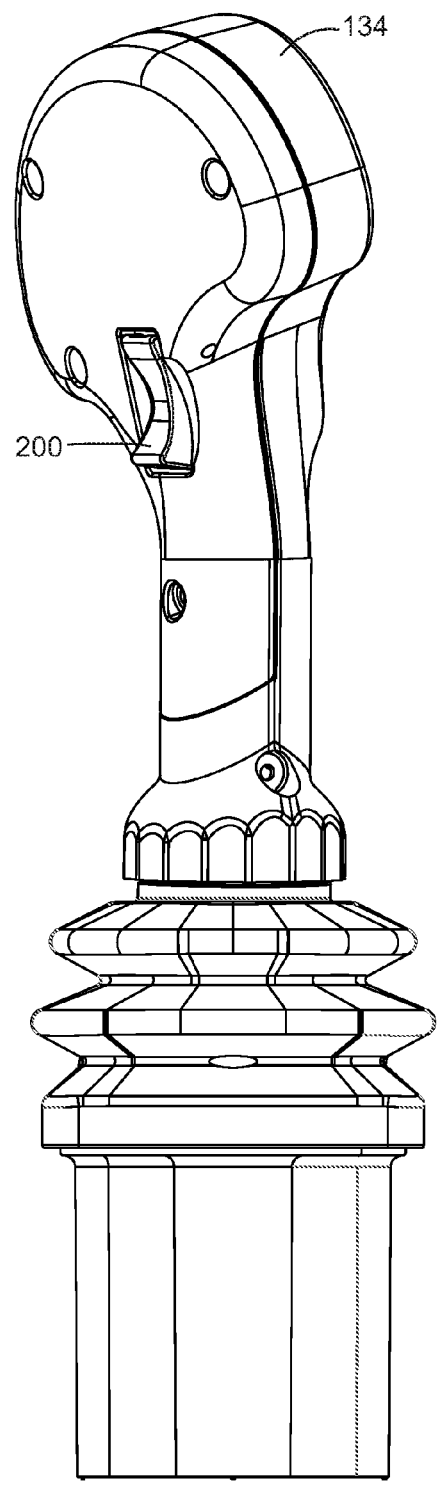
FIG. 11 is a rear view of the left joystick.

Referring now FIGS. 10 and 11, the following table delineates the functions for the various switches on left joystick 134:

| Number | Function Description |
|---|---|
| 184 | Horn. |
| 186 | Auto guide engage. |

-continued

| Number | Function Description |
|---|---|
| 188 | Chute in/out; left/right turn. |
| 190 | Rear grain cart axle return to center. |
| 192 | Grain unload orderly start/stop. |
| 194 | Auto crab of rear grain cart. |
| 196 | Lift auger in rear grain cart on/off. |
| 198 | Drag auger in rear grain cart on/off. |
| 200 | Grain unload panic stop. |

These functions of left joystick 134 should be viewed in combination with its other functions, as illustrated in FIG. 7 and accompanying description.

Figure 12:
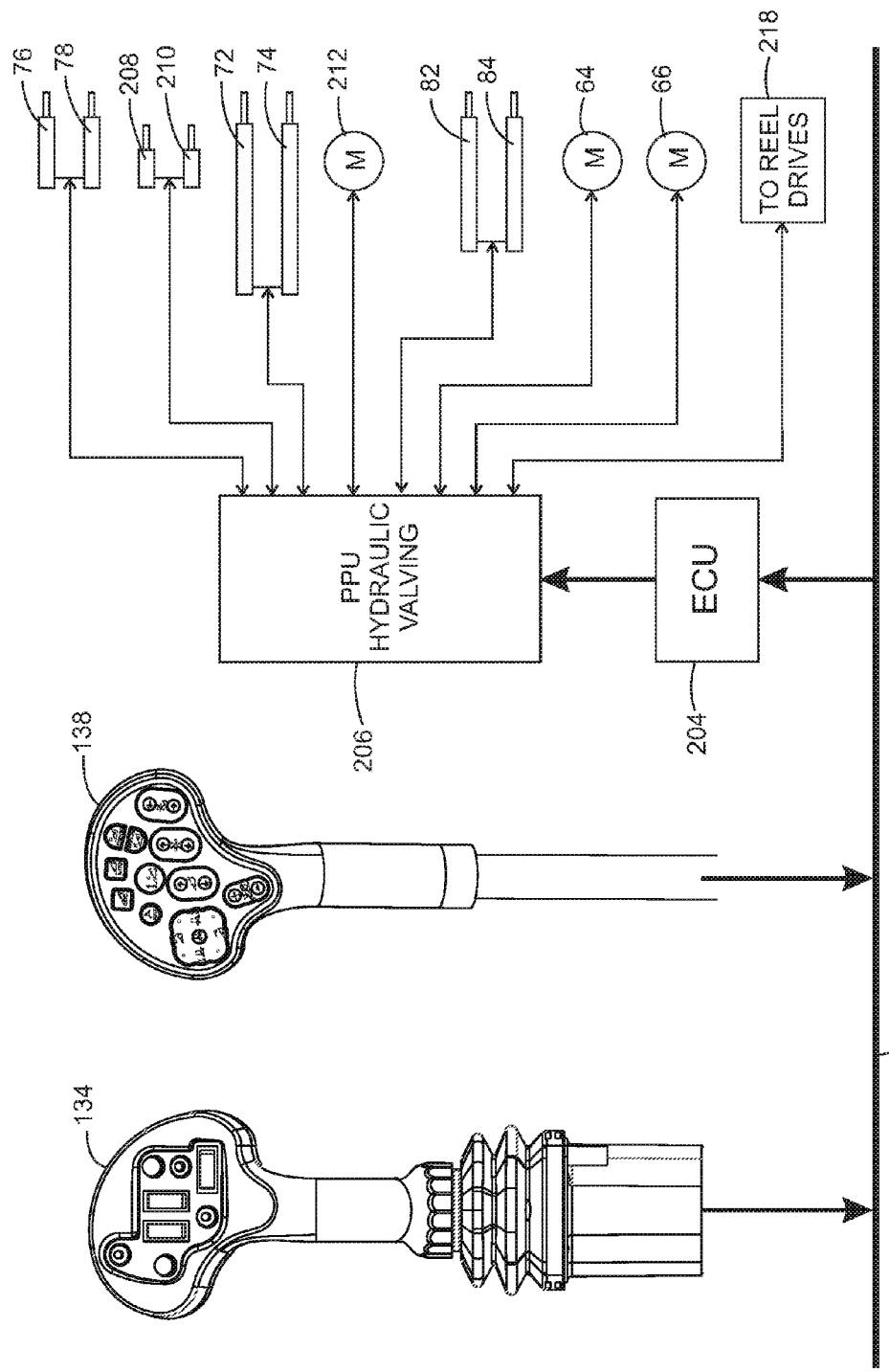
FIG. 12 shows the electronics bus and lines for control of the various combine valving, motors, and the like controlled by the right joystick.
Figure 13:
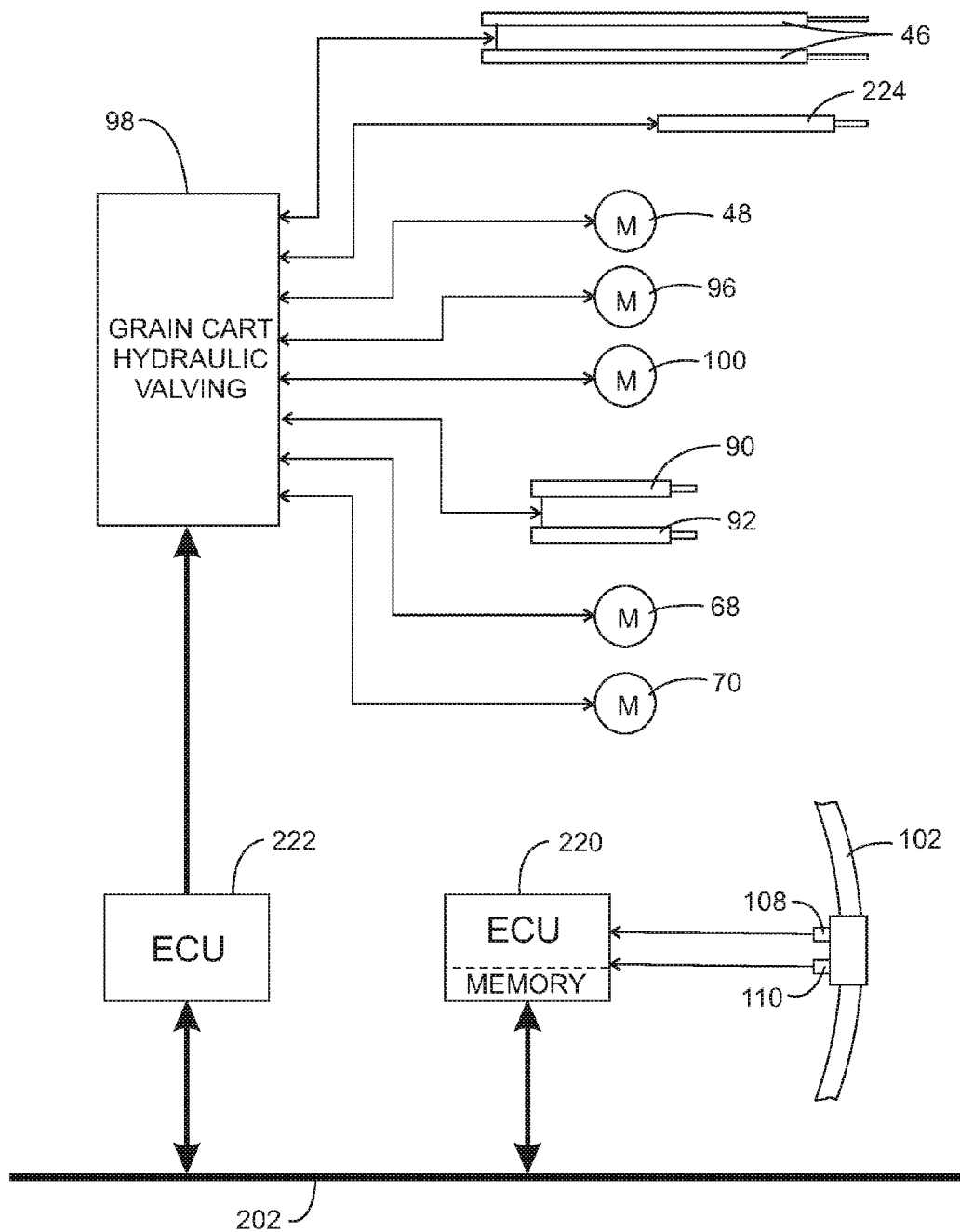
FIG. 13 shows the electronics bus and lines for control of the grain cart valving, motors, and the like controlled by the left joystick.

The various control functions described above for left joystick 134 and right joystick 138 are communicated to the various motors, cylinder assemblies, and the like, through a common bus, 202, as shown in FIG. 12. The signals communicated via bus 202 are sent to an electronic controller unit (ECU), 204, which continues signals to PPU 12 hydraulic PPU valving manifold 88 (see FIG. 4) from right joystick 138, which in turn sends signals to control various cylinder assemblies and motors on PPU 12, as follows:
cylinder assemblies 72 and 74 (see FIG. 3) that provide the lift movement of feeder assembly 50;
cylinder assemblies 76 and 78 (see FIG. 3) for movement up and down of the ends of grainhead 18;
cylinder assemblies 208 and 210 for feeder lift; jog motor 212;
articulation cylinders 82 and 84;
PPU front wheel motors 64 and 66:
head 50 drive motors, 214 and 216;
reel positioning drive, 218.

The signals communicated via bus 202 also are sent to an electronic controller unit (ECU), 220, which receives positioning signals from sensors 108 and 110 that read the teeth on beam 102, as described above, so that the operator knows the degree to which the articulation cylinders have moved in turning combine 10. ECU 220 also has memory that stores the degree of articulation when combine 10 is turned off, so that upon reengaging combine 10, the degree of articulation is known from this memory.

The signals communicated via bus 202 further are sent to an electronic controller unit (ECU), 222, which continues signals to grain cart 14 hydraulic valving manifold 98 for controlling various cylinder assemblies and motors on grain cart 14, as follows:
cylinder assemblies 46 and 224 for extending/retracting off-loading auger assembly 22
lift auger motors 48 and 96;
drag auger motor 100;
rear axle steering/crabbing cylinder assemblies 90 and 92;
grain cart 14 rear wheel motors 68 and 70.

Figure 14:
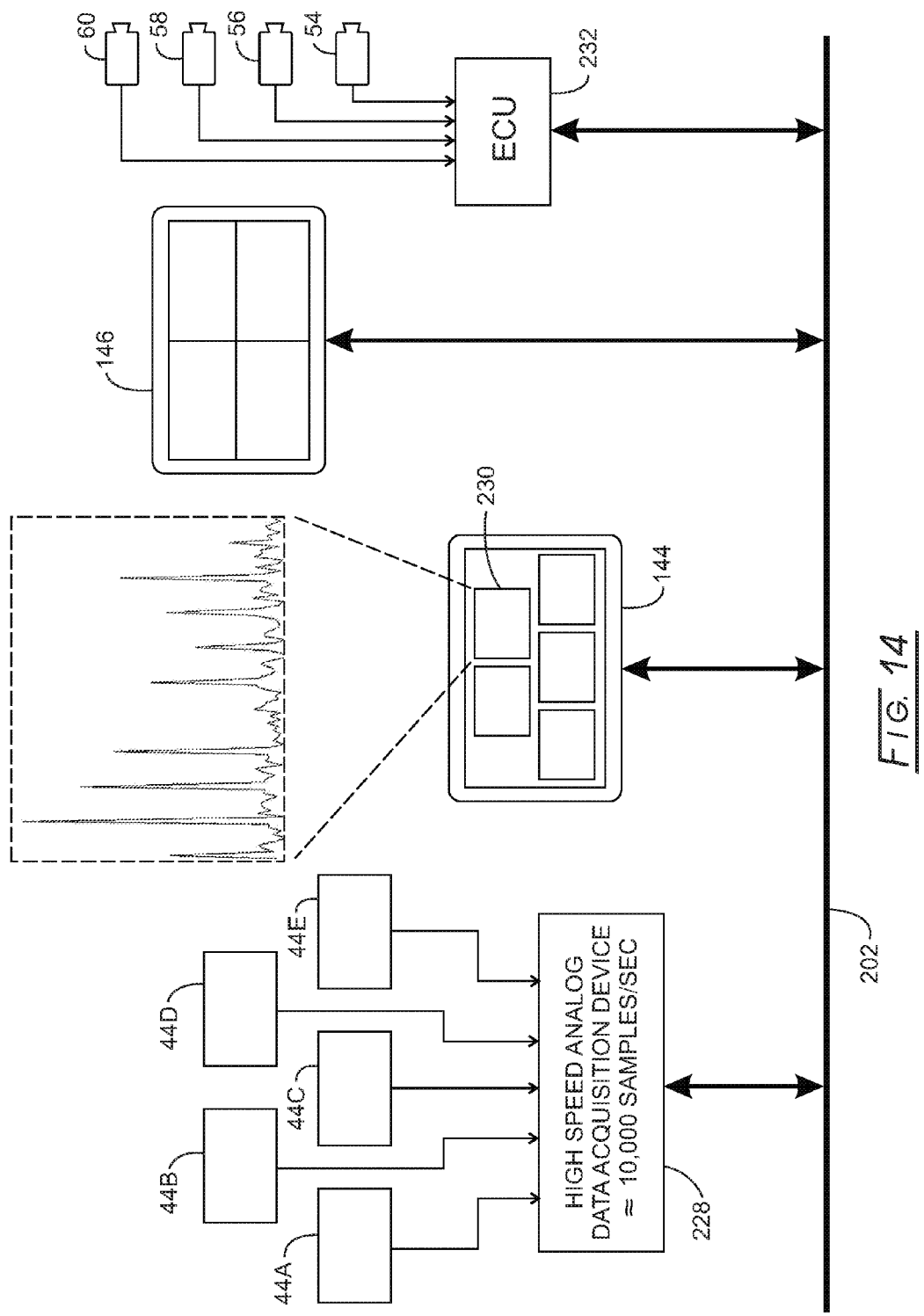
FIG. 14 shows the electronics bus and lines for the grain loss sensor pads, grain loss operator visual display, cameras, and camera displays.

Bus 202 continues in FIG. 14 where it connects with a high speed analog data acquisition device, 228, which in turn receives signals from grain loss sensor pads, 44A-44E. Device 228 sends its samples data via bus 202 to display 144 where one of the windows displays, 230, provides a visual representation of the grain loss data to the operator. A threshold value line appears on display 144 to aid the operator in interpreting the grain loss display values. Grain loss values for each of the 5 sensor pads gives the operator additional data at which location grain is being lost. The operator need not leave the cab and inspect the ground for this determination, but can see the visualized data in real time. If this visual data indicates that the loss of grain is unacceptably high, the operator can respond by varying the threshing variables for PPU 12. Signals from cameras 54, 56, 58, and 60 are sent to another ECU 232, which passes them via bus 202 to display 146 for monitoring by the operator.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A system for controlling functions of an articulated harvesting combine from an operator station of a chair assembly for the operator, the articulated harvesting combine including a forward powered processing unit (PPU), a rear grain cart, and an articulation joint with articulation cylinders connecting the PPU and the rear grain cart, which comprises:
   (a) a left hand joystick assembly movable forward and reverse for extending and retracting a grain unloader assembly, movable left and right to extend or retract the articulation cylinders to turn the articulated harvesting combine, and twisting to manually control crabbing of the rear grain cart; and
   (b) a right hand joystick assembly movable forwardly to control the forward speed of the articulated harvesting combine, and rearwardly to control the backward speed of the articulated harvesting combine.

2. The system of claim 1, wherein twisting of the left hand joystick also provides additional steering of the articulated harvesting combine.

3. A system for controlling functions of an articulated harvesting combine from an operator station of a chair assembly for the operator, the articulated harvesting combine including a forward powered processing unit (PPU), a rear grain cart having a grain unload assembly and a steering/crabbing axle assembly, and an articulation joint with articulation cylinders connecting the PPU and the rear grain cart, which comprises a pair of operator movable joysticks, where one of the joysticks controls the speed of the articulated harvesting combine; and the other joystick controls the grain unloaded assembly and steers the articulated harvesting combine including a combination of moving left/right and twisting of one of the joystick.

4. The system of claim 3, wherein the one of the joysticks is the right hand joystick and the other joystick is the left hand joystick.

* * * * *